United States Patent
Young et al.

(10) Patent No.: US 10,185,776 B2
(45) Date of Patent: Jan. 22, 2019

(54) SYSTEM AND METHOD FOR DYNAMICALLY CONTROLLED RANKINGS AND SOCIAL NETWORK PRIVACY SETTINGS

(71) Applicant: SHOCASE, INC., San Francisco, CA (US)

(72) Inventors: Ronald P Young, Mill Valley, CA (US); David Anthony Burgess, Menlo Park, CA (US); Peter Rugg, New York, NY (US)

(73) Assignee: SHOCASE, INC., San Francisco, CA (US)

( * ) Notice: Subject to any disclaimer, the term of this patent is extended or adjusted under 35 U.S.C. 154(b) by 171 days.

(21) Appl. No.: 14/712,673

(22) Filed: May 14, 2015

(65) Prior Publication Data

US 2015/0339494 A1 Nov. 26, 2015

Related U.S. Application Data (60) Provisional application No. 61/993,051, filed on May 14, 2014.

(51) Int. Cl.
*G06F 17/30* (2006.01)
*H04L 29/08* (2006.01)
(Continued)

(52) U.S. Cl.
CPC .. *G06F 17/30876* (2013.01); *G06F 17/30867* (2013.01); *G06F 21/6263* (2013.01); *H04L 63/104* (2013.01); *H04L 67/306* (2013.01)

(58) Field of Classification Search
CPC ..................................................... H04L 67/306
(Continued)

(56) References Cited

U.S. PATENT DOCUMENTS 7,290,033 B1 10/2007 Goldman et al.
8,234,688 B2 7/2012 Grandison et al.
(Continued)

OTHER PUBLICATIONS

Definition content from Electrical and Electronics Engineering Dictionary, © Wiley, 2004. Used by arrangement with John Wiley & Sons, Inc. http://www.dictionaryofengineering.com/definition/zero-signal.html.*

*Primary Examiner* — Khalil Naghdali
(74) *Attorney, Agent, or Firm* — Logan R. Marc, Esq.

(57) ABSTRACT

A system, method, and media for dynamically controlling rankings and privacy settings for a social network is presented. Upon receipt of an electronic communication from a second user of the social network directed to a first user of the social network, determining whether the first and second users of the social network are connected and determining whether the second user has been blocked from electronically communicating with the first user. in response to determining that the second user is not blocked, executing a ranking process on the second user, based on privacy level settings criteria pre-specified by the first user. The privacy level settings criteria includes preferred attributes of communicating users and a threshold ranking score and the ranking process compares the attributes of the second user to the privacy level settings criteria. Upon satisfying the threshold ranking score, the social network allows the electronic communication from the second user to be conveyed to the first user of the social network.

18 Claims, 5 Drawing Sheets

(51) Int. Cl.
*H04L 29/06* (2006.01)
*G06F 21/62* (2013.01)

(58) Field of Classification Search
USPC .......................................................... 726/28
See application file for complete search history.

(56) References Cited

U.S. PATENT DOCUMENTS

| | | |
|---|---|---|
| 8,484,749 B2 | 7/2013 | McIsaac et al. |
| 9,268,851 B2 * | 2/2016 | Lin ................... G06F 17/30864 |
| 9,268,865 B2 * | 2/2016 | Tseng ................ G06F 17/30867 |
| 9,319,442 B2 * | 4/2016 | Griffin ................ H04L 65/1093 |
| 9,342,990 B2 * | 5/2016 | Karpoff .................... G09B 5/00 |
| 9,407,708 B2 * | 8/2016 | Allen ...................... H04L 67/22 |
| 2009/0070334 A1 | 3/2009 | Callahan et al. |
| 2010/0030578 A1 * | 2/2010 | Siddique ............ G06Q 10/0637 705/3 |
| 2011/0213785 A1 * | 9/2011 | Kristiansson .......... G06Q 10/10 707/748 |
| 2012/0069131 A1 * | 3/2012 | Abelow ............... G06Q 10/067 348/14.01 |
| 2012/0117059 A1 | 5/2012 | Bailey et al. |
| 2012/0191585 A1 | 7/2012 | Lefebvre et al. |
| 2012/0210244 A1 | 8/2012 | de Francisco Lopez et al. |
| 2014/0007249 A1 | 1/2014 | Altaf et al. |

\* cited by examiner

SYSTEM AND METHOD FOR DYNAMICALLY CONTROLLED RANKINGS AND SOCIAL NETWORK PRIVACY SETTINGS

CROSS-REFERENCE TO RELATED APPLICATIONS

This Application claims priority to U.S. Provisional Patent Appln. Ser. No. 61/993,051, filed May 14, 2014 entitled, "SYSTEM AND METHOD FOR DYNAMICALLY CONTROLLED SOCIAL NETWORK PRIVACY SETTINGS."

This Application is also related to U.S. application Ser. No. 14/507,003, filed Oct. 6, 2014 entitled, "SYSTEM AND METHOD TO PROVIDE COLLABORATION TAGGING FOR VERIFICATION AND VIRAL ADOPTION," which claims priority to U.S. Provisional Patent Appln. Ser. No. 61/887,423, filed Oct. 6, 2013 entitled, "A SYSTEM AND METHOD TO PROVIDE COLLABORATION TAGGING FOR VIRAL VERIFICATION AND ADOPTION."

FIELD OF THE INVENTION

The invention generally relates to a social networking site platform and, more particularly to, a dynamically controlled privacy management ranking tool to be used in conjunction with social networking site platforms.

BACKGROUND OF THE INVENTION

Due to their immense popularity, social networking websites have spawned in prodigious numbers across the globe. These social networking sites allow users to become registered members and, as registered members, to utilize the system to socialize with other registered members. Most social networks permit and facilitate direct communication messages from one registered user to another and, in some cases, allow website visitors to communicate with registered users.

Given the vast membership of some of these social networking websites, the amount of unwanted direct messages received by a registered user may be unwieldy. It, therefore, may be desirable for registered users to have more control in configuring privacy settings to enhance their privacy and manage the volume and quality of communications received.

SUMMARY OF THE INVENTION

The invention, as disclosed herein, addresses the deficiencies and drawbacks noted above by providing systems and methods that are directed to dynamically controlled privacy management ranking tools to be used in conjunction with social networking site platforms.

The disclosed the system, method, and media is directed towards dynamically controlling rankings and privacy settings for a social network is presented. Upon receipt of an electronic communication from a second user of the social network directed to a first user of the social network, determining whether the first and second users of the social network are connected and determining whether the second user has been blocked from electronically communicating with the first user. in response to determining that the second user is not blocked, executing a ranking process on the second user, based on privacy level settings criteria pre-specified by the first user. The privacy level settings criteria includes preferred attributes of communicating users and a threshold ranking score and the ranking process compares the attributes of the second user to the privacy level settings criteria. Upon satisfying the threshold ranking score, the social network allows the electronic communication from the second user to be conveyed to the first user of the social network.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

In the following description, for the purposes of explanation, numerous specific details are set forth in order to provide a thorough understanding of the implementations of the invention. It will be appreciated, however, by those having skill in the art that the implementations of the invention may be practiced without these specific details or with an equivalent arrangement. In other instances, well-known structures and devices are shown in block diagram form in order to avoid unnecessarily obscuring the implementations of the invention.

A user of a social network has many reasons to send a message through the social network system to another user. If the recipient user is known to the sender user, the message could relate either to social or business needs. Similarly, a user may desire to send such a message to a stranger who is nevertheless a user of the same social network. The user sender's message may propose some social or business premise that may be based on information that the recipient user displays on the same social network. In the proposed sending of any message via a social network, the network managers will have protocols and privacy settings that can determine how such a message must be handled. A social network set up to provide merely social interaction between users may have simple protocols as there is low probability that a user wishes to receive unsolicited messages from strangers on the network. However when the social network is being utilized for business, sport, performance other purposes that are not purely social in nature, there can be sending of unsolicited messages to stranger, and thus a desperate need to manage each user's privacy with more robust privacy management tools.

An embodiment of the present invention is uniquely focused on automatically ranking users of a social network—with the intent to increase privacy for each user. It assigns a rank to each user and only allows those with a sufficiently high rank to send a message through the social network to a social network user who is not otherwise connected through the social network. Unlike the prior art, which requires special computer devices or focus only on privacy settings already built into each social network, an embodiment of the present invention functions to permit a social network user to set incoming messages (and other) privacy levels that can be based on a ranking of other users determined by a plurality of personal profile and posting data that carefully measure and rank the seniority and authority of the sender. With such a ranking and privacy in place, in an embodiment, privacy settings can be dynamically changed as the rank of the user changes, and a social network user can set privacy levels to receive relevant messages for other network users who are ranked with sufficient stature in the field to be worthy of messaging.

With an embodiment of the present invention, dynamic personal privacy significantly changes and improves the nature of social networks as we know them today. An embodiment of the invention utilizes high level data captured in a robust social network system, and deploys a ranking system that allows each user of a social network to specify precise criteria that must be met by other users before they can interact. An embodiment of the invention prevents viewing of data or the receipt of messages sent by those other users who do not meet a user's personal criteria. A system according to an embodiment of the invention increases the overall value of each network on which it is deployed, in that, instead of connecting with everyone randomly, each connection hold a particular value and thusly, every user of a social network can carefully curate his/her network list by only allowing in specific connections that match their desired criteria or rank.

Figure 1:
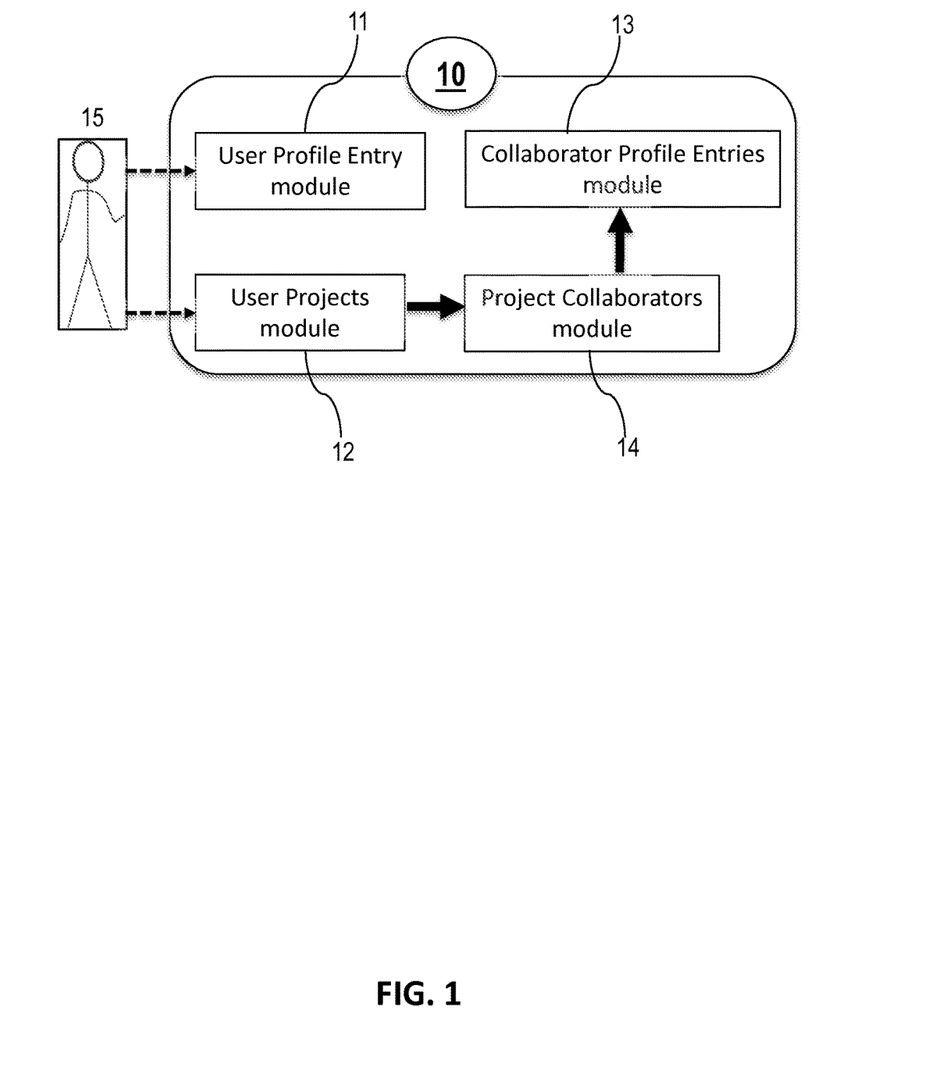
FIG. 1 depicts a general overview of social network system containing dynamically controlled privacy management tools, in accordance with various aspects of the present disclosure.

FIG. 1 depicts a general overview of social network system 10 containing dynamically controlled privacy management tools, in accordance with various aspects of the present disclosure. Social network system 10 is a network-accessible (e.g., Internet) social network that may be accessed by any number of communication-enabled devices, such as, for example, a desktop computer, laptop, mobile device, cellular/smartphone, gaming device, tablet computer, personal communication system (PCS) device, personal digital assistant (PDA), personal audio device (PAD), portable navigational device, and/or any other electronic wireless-enabled device configured to transmit and receive communications via wired or wireless networks.

The platform of social network system 10 may comprise server(s) that host the social network system 10 website. The server(s) may incorporate processing unit(s) that may be familiar to those skilled in the art in order to execute the processing described henceforth. The server(s) may also incorporate one or more memory storage devices that store information related to the processing described henceforth, such as, user profile entry information, user project information, project collaborator information, and collaborator profile entry information, by way of respective modules communicating such information to database(s). The database(s) may include, or interface with, for example, an Oracle™ relational database, Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more of such databases that reside in one or more physical devices and in one or more physical locations.

Returning to FIG. 1, social network system 10 includes multiple-element user profile module 11 and projects module 12. As part of the registration process, social network system 10 requires user 15 to submit information relative to at least some portions of multiple-element user profile module 11 as well as submit information relative to projects module 12. As described in greater detail below, multiple-element user profile module 11 is configured to receive and store identification information that alone or in combination uniquely identifies user 15 in a unique personal profile while projects module 12 is configured to collect and store information regarding projects, activities, performances, endeavors etc. that user 15 has been involved with for the purposes of social interaction on social network system 10.

Social network system 10 further includes project collaborators module 14. Project collaborators module 14 is configured to identify, retrieve, and provide registered and unregistered collaborators 14 associated with each project, activity, etc. defined by user 15 in projects module 12. Additionally, other registered collaborators have the opportunity to name additional collaborators. Such collaborators may include, for example, co-workers, clients, agents, or business people working in a contractor or sub-contractor role on a project; teammates, coaches, referees, opponents, or managers in a sporting endeavor; writers, cast, production crew, directors, performers in a production, etc.

As noted above, collaborators may or may not be registered users of social network system 10. If they are registered users, then each registered user-collaborator will have a corresponding unique personal profile stored in social network system 10, in accordance with the registration process requiring the submission of information relative to multiple-element user profile module 11 and will be listed in collaborator profile entries module 13. Furthermore, each such registered user-collaborator will have consented to being characterized in the role of a collaborator on the subject project. In so doing, each registered user-collaborator provides verification of the existence of the project as well as the role that the registered user and the registered user-collaborator each played in the project.

Figure 2:
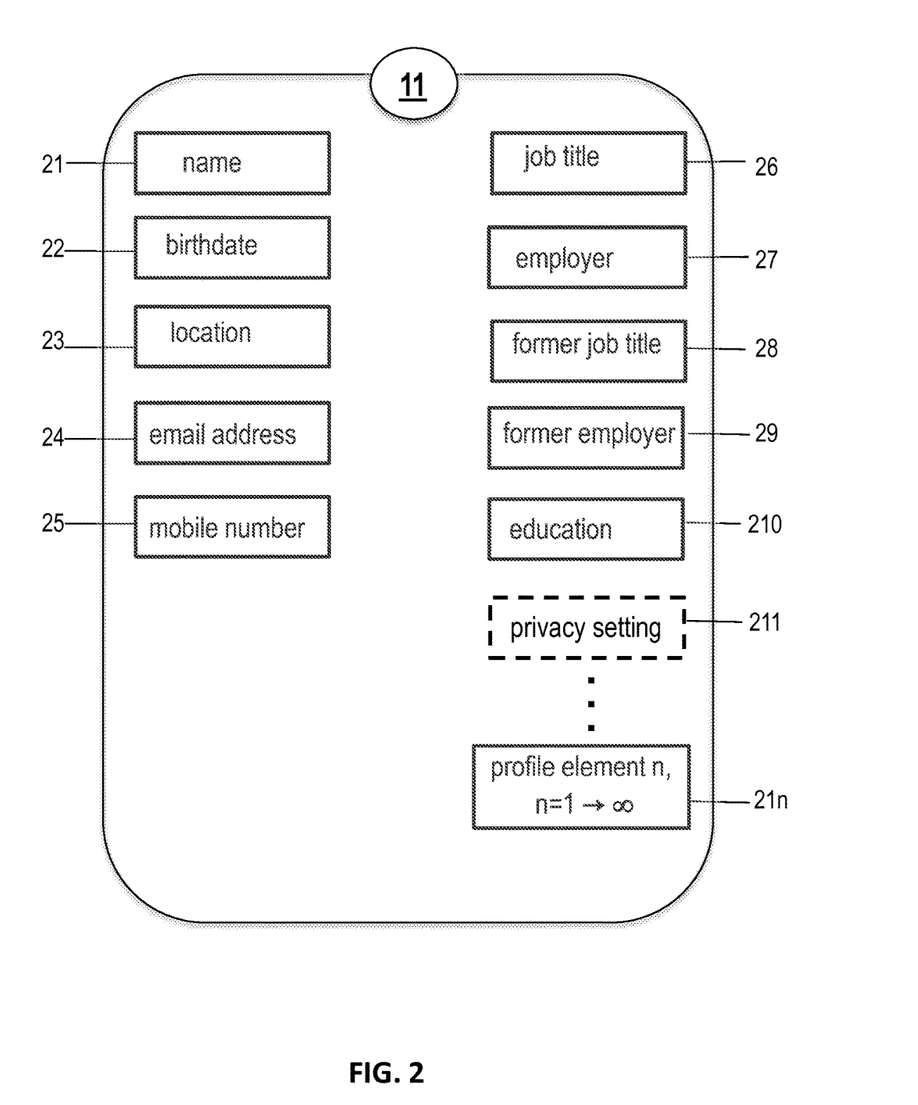
FIG. 2 depicts an exemplary embodiment of multiple-element user profile module, in accordance with various aspects of the present disclosure.

FIG. 2 depicts an exemplary embodiment of multiple-element user profile module 11, in accordance with various aspects of the present disclosure. As noted above, multiple-element user profile module 11 of social network system 10 serves to store identification information that alone or in combination uniquely identifies user 15 in a unique personal profile. Thus, the elements of multiple-element user profile module 11 may include personal identification elements, such as, name 21, location 23, email address 24 and mobile number 25. It will be appreciated that other elements, such as, birthdate 22, job title 26, employer 27, former job title 28, former employer 29, and education 210 are elements that can indicate the level of maturity, higher education, job responsibility, experience, authority, and seniority, which can be utilized to effectively rank the registered user's 15 position in business, sports, performance, or other endeavors. Optionally, multiple-element user profile module 11 may also provide registered users with the opportunity to configure their own privacy level settings in element 211, as described in greater detail below. Clearly, as illustrated, multiple-element user profile module 11 may incorporate a vast number of elements 21n.

Figure 3:
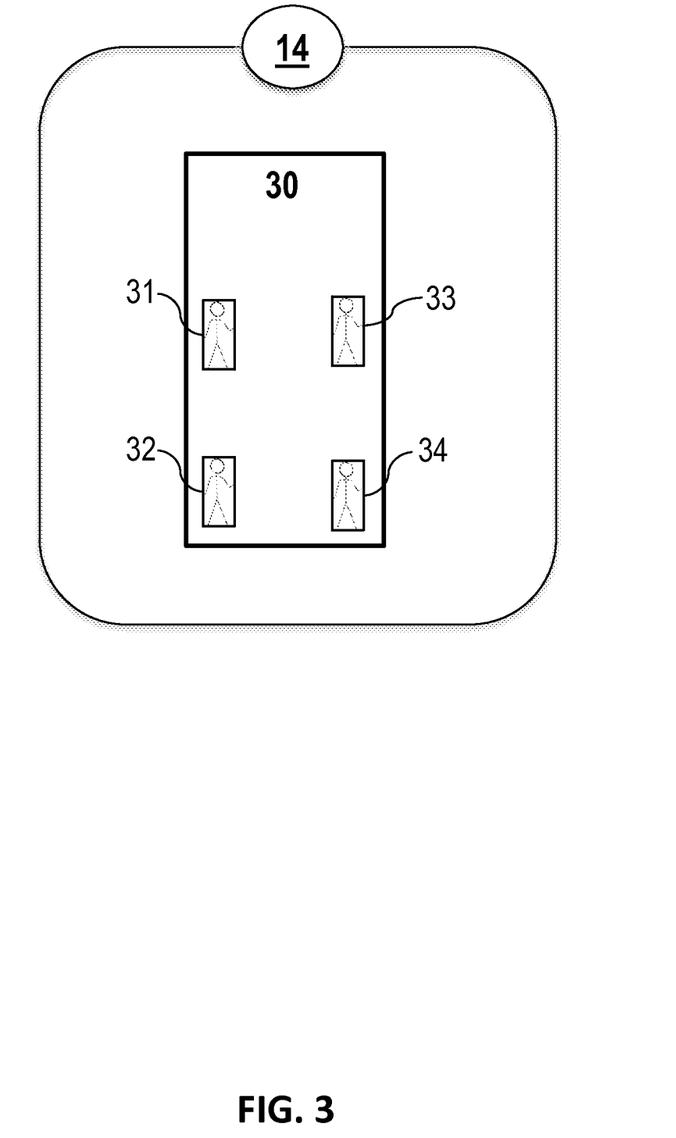
FIG. 3 depicts multiple collaborators identified as being associated with a project, in accordance with various aspects of the present disclosure.

FIG. 3 illustrates how that there can be multiple collaborators 31-34 identified as being associated with a project 30, in accordance with various aspects of the present disclosure. In particular, upon a user submitting information to projects module 12 regarding project 30, project collaborators module 14 operates to identify and list both, registered and unregistered collaborators 14 that have been or are currently are associated with project 30. It will be appreciated that the availability of user profile data of multiple collaborators associated with user's submission of project 30 information, allows for the further verification, assessment, and ranking of the project details and the user's and collaborators' unique personal profiles.

Figure 4:
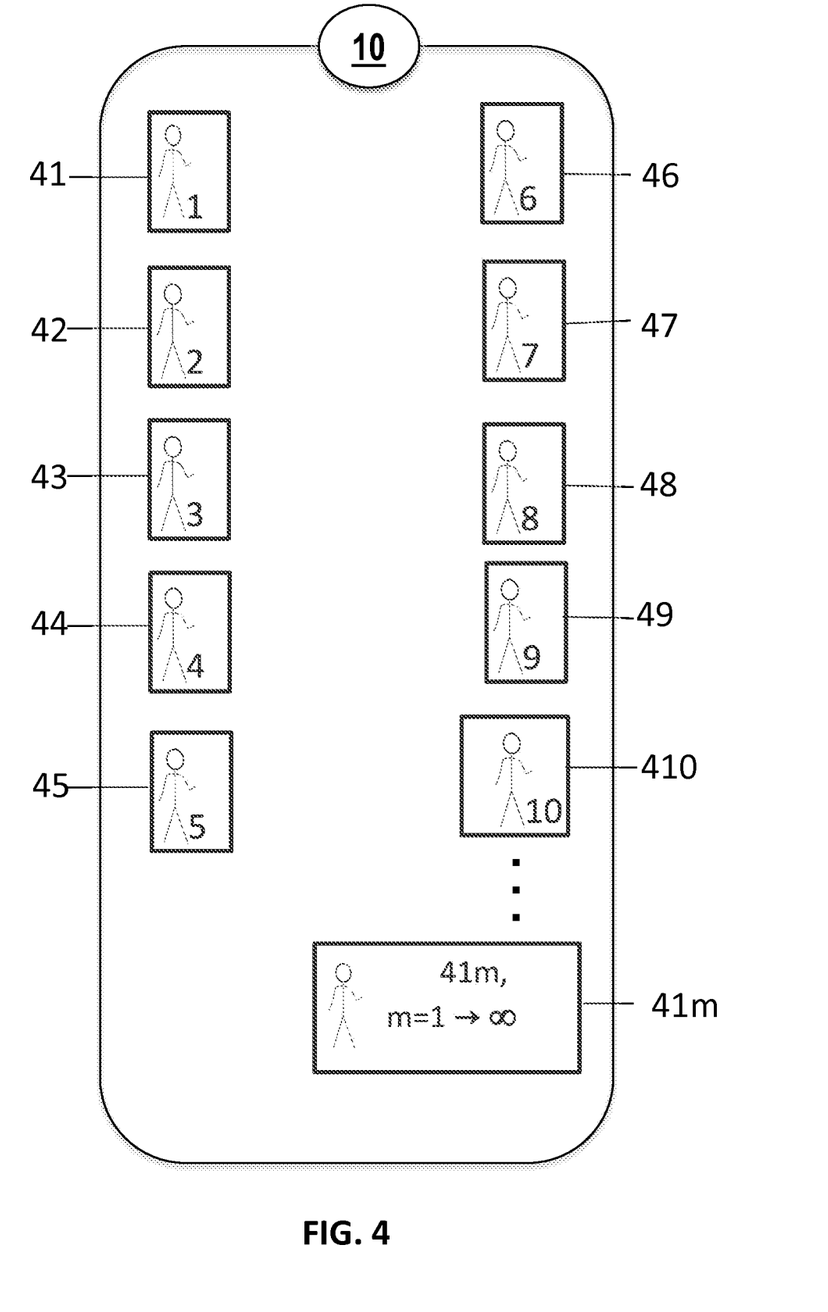
FIG. 4 further illustrates the growth of registered users of social network system, in accordance with various aspects of the present disclosure.

FIG. 4 further illustrates that, in principle, there is virtually no limit to the number of registered users 41-41m of social network system 10. This is because the growth of registered users is organically linked to the collaboration efforts of participants on submitted projects—which is then verified through the checks and balances of the collaborators' requirements to certify the details of projects and other users' profile data. As such, the "network effect" of such organic growth encourages joint collaboration and provides verification of the social network data to become more valuable to all registered users of social network system 10.

Attention will now be turned to a detailed description of the operational process of the dynamically controlled privacy management ranking tool used in conjunction with social network system 10, in accordance with various aspects of the present disclosure. In particular, social network system 10 presents a registered user with the opportunity to configure their own privacy settings as well as update such settings at any time, thereby empowering registered users to take active control in managing what communications/solicitations they receive.

In one embodiment, social network system 10 allows registered users to submit their preferred privacy levels by registering such preferences in multiple-element user profile module 11, such as, through privacy setting element 211 noted above. In other embodiments, social network system 10 may present registered users with inquiries and/or menu-based communications to enable registered users to respond and select their preferred privacy level settings. In some embodiments, users may consider qualities such as fame, experience, authority, seniority, and set levels relative to themselves by which other user's access to communications will be limited.

Regardless of the input method employed, social network system 10 is configured to allow registered users to set their preferred privacy levels regarding communication/solicitation messages sent by other registered users by virtue of specifying certain privacy level criteria Such privacy level criteria may include, but is not limited to, allowing or blocking communications from: identified registered users, system-connected registered users, previous/current "Liked" or "Friended" users, previous/current collaborators, previous/current colleagues, previous/current coworkers, previous/current classmates, registered users of certain ages, registered users having certain job titles, registered users of certain ages, registered users having worked for certain employers, registered users achieving certain education levels, registered users having certain experiences, and/or any other attribute or combination of attributes that may be captured in any registered users' personal profile etc. The system is flexible to use any number of ranking algorithms based on project type, impact power, numbers of projects, number of projects with awards, or other measures.

Furthermore, privacy level criteria may also include specifying user acceptable ranking thresholds in conjunction with a ranking procedure/algorithm, to distinguish amongst potentially qualifying registered users, such as rankings based on a figure of merit score (e.g., ≥3.2/4.0) or based on a relative scale (e.g., best, good, average, below average). It will be appreciated that these privacy level criteria may then be stored in the memory storage device(s) and associated database(s) of social network system 10 and are configured to be updated/revised at any time by the registered users. Registered users can set their privacy setting based on any available ranking, with thresholds set at a specific level or a rank relative to the user himself based on job, seniority, authority, awards, accomplishments, or any combination of such measures.

By way of an illustrative, non-limiting example, suppose user A is a director of educational services and has specified in her privacy level criteria to allow communications from other registered users that are current coworkers, colleagues, collaborators, as well as registered users that have at least 5 years teaching experience or a post-graduate degree in education. User A may have further specified to block communications from registered users that are not current coworkers, colleagues, collaborators nor possess at least at least 5 years teaching experience and do not have a ranking merit score of 3.0 or greater. Consistent with this example, suppose user X, user Y, and user Z attempt to communicate with user A, in which user X's personal profile indicates that she is not a current coworker/colleague/collaborator, but has 6 years teaching experience and possesses a PhD. in education. User Y's profile indicates that he is a current colleague, has 2 years teaching experience, and has a Master's Degree in education. And, user Z's profile indicates that she is a current colleague, has 9 years of teaching experience, and is working towards her Master's Degree.

Social network system 10 then ranks users X, Y, and Z by applying their personal profile and related project attributes to a ranking process, and determines compliance for each communication request based on user A's privacy level settings criteria. It will be appreciated that the specific ranking algorithm used is not limiting, as there are a plurality of algorithms available to those skilled in the art. Based on this criteria, social network system 10 may rank user X with a score of 0.0, user Y with a score of 3.2, and user Z with a score of 3.5. As such, the communication of users Y and Z will be delivered to user A.

Figure 5:
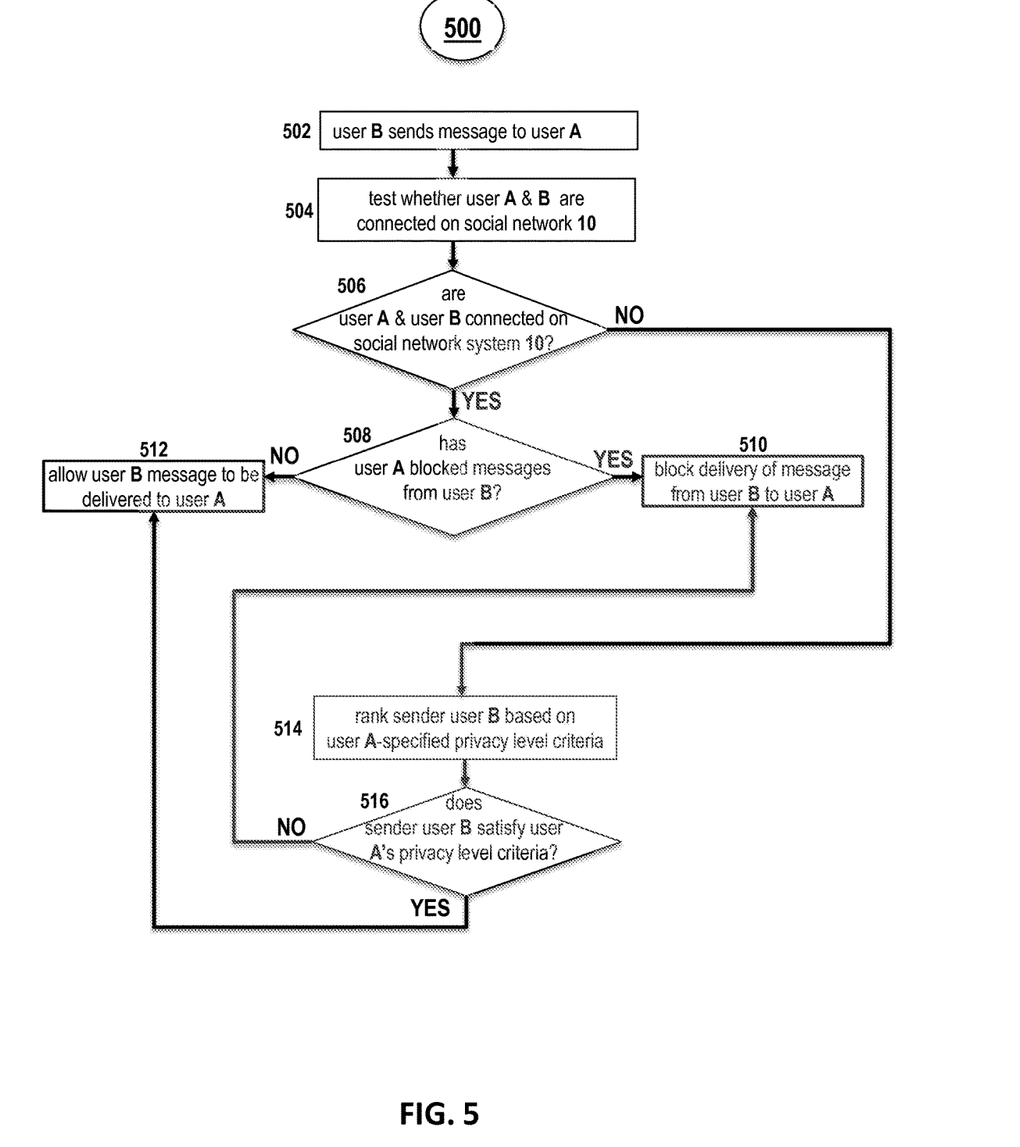
FIG. 5 depicts a general flow chart diagram of the dynamically controlled privacy management process used in conjunction with social network system.

To this end, FIG. 5 depicts a general flow chart diagram of the dynamically controlled privacy management process 500. Process 500 is executed by the processing unit(s) in conjunction with the information stored in the electronic storage device(s) and database(s) of social network system 10. As shown at block 502, a registered user B attempts to communicate with registered user A, by sending an electronic message via social network system 10. At block 504, social network system 10 tests whether user A and user B are "connected" on social network system 10. That is, social network system 10 tests for previous and/or recently occurring connections between users A and B, by searching and assessing a variety of factors, including, but not limited to, whether the users have "Liked" or "Friended" each other, have previously communicated with each other via system 10, have collaborated or currently collaborate on projects as evidenced by collaborator profile entries module 13, have worked or currently work for the same employer as evidenced by user profile module 11, etc.

Based on such assessments, process 500 at decision block 506, then determines whether registered users A and B are connected on social network system 10. If so (as identified by "YES" at block 506 in FIG. 5), process 500 progresses to decision block 508 to determine whether user A has indicated to social network system 10, by virtue of user A's most current privacy level settings criteria, that user B should specifically be blocked from communicating with user A. If such communications are not blocked by user A (as identified by "NO" at block 508 in FIG. 5), process 500 progresses to block 512 to instruct social network system 10 to enable the delivery of the user B communication message to user A. If user A has specifically indicated to social network system 10 that it no longer desires to receive communications from user B (as identified by "YES" at block 508 in FIG. 5), process 500 progresses to block 510 to instruct social network system 10 to block the communication message sent from user B to user A.

Returning back to decision block 506, if process 500 determines that registered users A and B are not connected on social network system 10 (as identified by "NO" at block 506 in FIG. 5), process 500 progresses from block 506 to block 514, where social network system 10 proceeds to perform a ranking procedure on user B based on user A-specified privacy level settings criteria. That is, as discussed above, social network system 10 stores attributes of each registered user via their personal profile. Armed with this personal profile information, social network system 10 applies a ranking procedure on the personal profile attributes of user B in view of user A's most current privacy level settings criteria, including a specified threshold ranking score. Then, at decision block 516, process 500 determines whether user B's ranking satisfies user A's specified criteria. If so, process 500 returns back to block 512 to instruct social network system 10 to enable the delivery of the user B communication message to user A. If process 500 determines that user B's ranking does not satisfy user A's specified criteria, process 500 returns back to block 510 to instruct social network system 10 to block the communication message sent from user B to user A.

In this manner, the dynamically controlled privacy management process 500 provides the operators of the social network system with the means to more accurately screen and rank users in order to maintain the privacy of other users. Process 500 has been directed toward the privacy of a user recipient of a message sent from an unknown user. In another embodiment, the invention can be applied to the rank of a user who has access to view another user's postings, projects, collaborators, or personal user profile.

Moreover, given that the privacy level criteria is specified by a user and is measured against users' personal profile information, process 500 is indeed dynamic, as users naturally advance in their personal and professional lives, such as gaining more experience, increasing their education levels, switching employers, engaging in new endeavors, etc. Accordingly, user interactions may change as a user who would have not have met the specified privacy level criteria threshold on one day, may soon be allowed to interact due to a change in either the user's or user sender's status.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer-implemented method of dynamically controlling rankings and privacy settings for a social network comprising:
   receiving an electronic communication from a second user of the social network directed to a first user of the social network;
   determining whether the first and second users of the social network are already connected, wherein the determination of whether the first and second users are already connected includes identifying one or more collaborators on a project, the collaborators including any registered and unregistered collaborators on the project, wherein each registered collaborator verifies the existence of the project and a role of each of the collaborators, the registered collaborators being able to name additional collaborators;
   if the first and second users are not already connected in the social network, determining whether a professional achievement level of the second user satisfies one or more privacy level settings criteria pre-specified by the first user, wherein the professional achievement level of the second user is determined based on one or more professional attributes, the professional attributes including job title, length of experience, awards, accomplishments, employer, and education, and wherein the professional achievement level is calculated as a professional achievement level score that has a numerical value; and
   conveying the electronic communication from the second user to the first user only if:
     the first and second users are already connected in the social network; or
     the professional achievement level of the second user satisfies the privacy level settings criteria pre-specified by the first user, wherein a threshold numerical value is at least based on the privacy level settings criteria, the privacy level settings criteria being satisfied when the professional achievement level score meets or exceeds the threshold numerical value, the satisfaction of the privacy level setting criteria occurring even when none of the professional attributes associated with the first user match any of the professional attributes associated with the second user.

2. The computer-implemented method of claim 1, further comprising updating the privacy level settings criteria responsive to one or more changes in at least one professional achievement level of the first user.

3. The computer-implemented method of claim 1, wherein the privacy level settings criteria are based at least in part on a professional achievement level of the first user.

4. The computer-implemented method of claim 1, wherein the privacy level settings criteria specify a minimum required professional achievement level of the second user.

5. The computer-implemented method of claim 4, wherein the minimum required professional level of the second user is defined based on a professional achievement level of the first user.

6. The computer-implemented method of claim 1, wherein the privacy level settings criteria specify a minimum required similarity between the professional achievement level of the second user and a professional achievement level of the first user.

7. The computer-implemented method of claim 1, wherein the privacy level settings criteria specify respective values for a plurality of attributes of the second user.

8. The computer-implemented method of claim 7, wherein the privacy level settings criteria specify at least a minimum value for at least one of the attributes of the second user.

9. The computer-implemented method of claim 8, wherein the minimum value for at least a given attribute is defined based on a corresponding value for the given attribute of the first user.

10. The computer-implemented method of claim 7, wherein the privacy level settings criteria specify values for at least one of the attributes of the second user similar to corresponding attribute values of the first user.

11. The computer-implemented method of claim 1, wherein determining whether a professional achievement level of the second user satisfies one or more privacy level settings criteria pre-specified by the first user comprises calculating a figure of merit score for at least the second user.

12. The computer-implemented method of claim 11, wherein the figure of merit score is calculated based at least on length of experience and education.

13. The computer-implemented method of claim 11, wherein the privacy level settings criteria specify at least a minimum value for the figure of merit score for at least the second user.

14. The computer-implemented method of claim 11, wherein the privacy level settings criteria specify at least a minimum similarity between the figure of merit score for at least the second user and a figure of merit score for the first user.

15. The computer-implemented method of claim 1, wherein determining whether a professional achievement level of the second user satisfies one or more privacy level settings criteria pre-specified by the first user comprises:
calculating respective figure of merit scores for a plurality of potentially qualifying registered users, including at least the second user; and
ranking the plurality of potentially qualified registered users, including at least the second user, based on their respective figure of merit scores.

16. The computer-implemented method of claim 1, wherein the determination whether the first and second users of the social network are already connected comprises identifying previous electronic communications between the first and second users.

17. An apparatus comprising:
a memory; and
at least one processor, coupled to said memory, and configured: (i) to receive an electronic communication from a second user of a social network directed to a first user of the social network; (ii) to determine whether the first and second users of the social network are connected, wherein the determination of whether the first and second users are connected includes identifying one or more collaborators on a project, the collaborators including any registered and unregistered collaborators on the project, wherein each registered collaborator verifies the existence of the project and a role of each of the collaborators, the registered collaborators being able to name additional collaborators; (iii) to determine whether the second user has been blocked from electronically communicating with the first user; and (iv) in response to determining that the second user is not blocked, to execute a ranking process on the second user based on privacy level settings criteria pre-specified by the first user;
wherein the privacy level settings criteria pre-specified by the first user include professional attributes and a threshold ranking score;
wherein the ranking process determines a ranking score of the second user based on the professional attributes associated with the second user;
wherein the privacy level settings criteria is satisfied when the ranking score of the second user meets or exceeds the threshold ranking score, the satisfaction of the privacy level setting criteria occurring even when none of the professional attributes associated with the first user match any of the professional attributes associated with the second user; and
wherein upon satisfying the privacy level setting criteria, the social network allows the electronic communication from the second user to be conveyed to the first user of the social network.

18. A non-transitory computer readable medium comprising computer executable instructions which when executed by a computer cause the computer:
to receive an electronic communication from a second user of the social network directed to a first user of the social network;
to determine whether the first and second users of the social network are connected, wherein the determination of whether the first and second users are connected includes identifying one or more collaborators on a project, the collaborators including any registered and unregistered collaborators on the project, wherein each registered collaborator verifies the existence of the project and a role of each of the collaborators, the registered collaborators being able to name additional collaborators;
to determine whether the second user has been blocked from electronically communicating with the first user; and
in response to determining that the second user is not blocked, to execute a ranking process on the second user based on privacy level settings criteria pre-specified by the first user;
wherein the privacy level settings criteria pre-specified by the first user include professional attributes and a threshold ranking score;
wherein the ranking process determines a ranking score of the second user based on the professional attributes associated with the second user;
wherein the privacy level settings criteria is satisfied when the ranking score of the second user meets or exceeds the threshold ranking score, the satisfaction of the privacy level setting criteria occurring even when none of the professional attributes associated with the first user match any of the professional attributes associated with the second user; and
wherein upon satisfying the privacy level setting criteria, the social network allows the electronic communication from the second user to be conveyed to the first user of the social network.

* * * * *